Dec. 12, 1933.          C. E. K. MEES          1,939,219
PROCESS FOR PREPARING MOTION PICTURES BY DYE TRANSFER
Filed Jan. 4, 1930
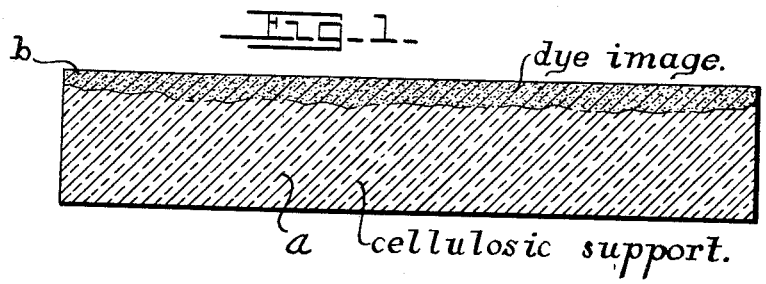
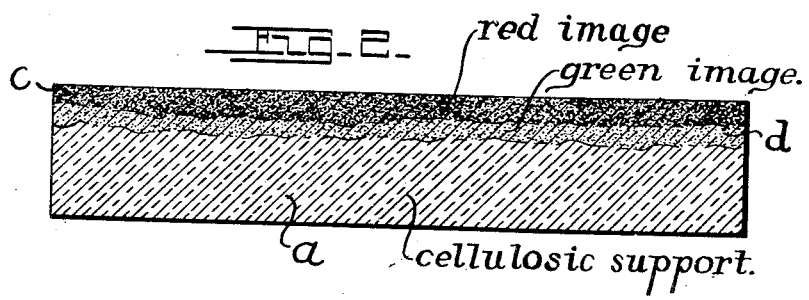
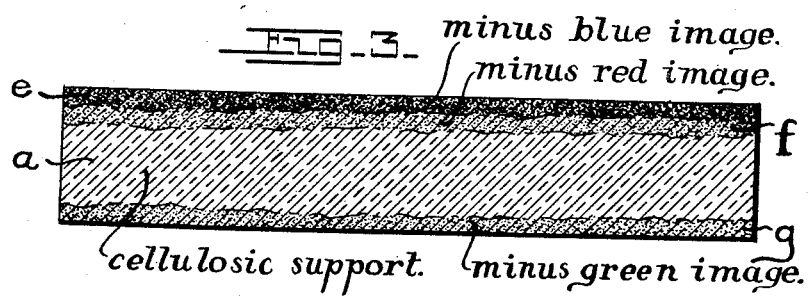
Charles E. K. Mees.

Patented Dec. 12, 1933

1,939,219

UNITED STATES PATENT OFFICE 1,939,219

PROCESS FOR PREPARING MOTION PICTURES BY DYE TRANSFER

Charles E. Kenneth Mees, Rochester, N. Y., assignor to Eastman Kodak Company, Rochester, N. Y., a corporation of New York Application January 4, 1930. Serial No. 418,547

2 Claims. (Cl. 41—26)

This invention relates to a process of preparing colored or other motion pictures comprising the transfer of dye images from a master relief directly to a film base which has been specially treated so as to render it capable of receiving such dyes from substantially aqueous solutions. The method of pre-treatment to be given the film is that described in co-pending application, Serial No. 418,652 filed January 4, 1930, by K. C. D. Hickman. The preferred method for carrying out the process is to subject the film base, either in one step or successively, to the action of 4% sodium hydroxide and a solution of $\frac{1}{10}$ to 2% potassium permanganate, both in water at a temperature of 70° C.

In numerous previous patent and literature references the preparation of colored motion pictures has been carried out by transferring dye images from a master relief to film coated with blank gelatine or some other receptive substance. Sometimes two such images are transferred to each of the two sides of a gelatine coated film, in other cases two images are transferred to the same side of the film. In either case, great care must be taken to obtain exact register between the two images.

The object of my invention is to accomplish substantially the same result, with improvements, by transferring the dye image by imbibition or transfusion to uncoated but specially treated film base instead of coated film, whereby numerous advantages are secured.

In the accompanying drawing, the appearance of the final picture is shown in cross-section.

Fig. 1 shows a film support with a single dye image on one side;

Fig. 2 shows two dye images on one side of a film support;

Fig. 3 shows a three color image, there being two dye images on one side and a third on the other side.

My invention is carried out in the following manner. A master relief image is prepared, by processes well known in the art, from the original motion picture negative. A typical method is that disclosed in the Ives Patent No. 1,186,000. This relief image is then allowed to absorb a dye from a substantially aqueous solution and the dye image is then transferred by pressure to one side of a film which has been pre-treated to receive said dye. The method of pre-treatment is that specifically described and claimed by Hickman. In this manner any number of reproductions of a motion picture can be made in black or in any tint.

A typical manner of carrying out the invention with relation to the production of color motion pictures is as follows. Two separate color negatives are taken through complementary filters and made in one of the well known ways. From these are produced, as before, two relief master images. Each of these relief images is then allowed to absorb a dye and this dye image is then transferred by pressure to one side of the film which has been pre-treated to receive the dye. By transferring two color images in register to one side or opposite sides of the film, there results a complete colored positive record of the subject.

In the manner described, I may therefore produce motion pictures of a neutral tint or a color made up of one color record, b on one side of the film support a, as shown in Fig. 1; one color record on each side of the film; two color records c and d on one side of the film support a; or more than two colors by combining several on one side as illustrated in Fig. 3, in which e and f are dye images on one side and g is a third on the opposite side. For color motion pictures, the preferred method is to use three colors, two of them being on one side. Another successful method is to use two colors on each side.

The final result of this process is a color record which is somewhat different from those hitherto attained in the art since it is uncoated, and which has the following advantages. It is less susceptible to moisture and therefore it is less likely to dry out, shrink or become brittle. It is less effected by oil spots accumulated from the projector. Such spots could easily and quickly be wiped off. The film would require no waxing or lubricating, be less likely to stick in the gate of the projector, and be less likely to buckle. It could be processed more rapidly as it would dry faster than the gelatine coated film. It would be less susceptible to scratches occurring after being projected many times. It could also be more easily protected by cellulose varnishes. Lastly it forms a very good method for cheap reproduction of motion pictures, it being possible to produce a number of copies in black and white or in any tint much more cheaply than on emulsion coated stock.

What I claim is:

1. An article of manufacture comprising an uncoated motion picture film support of plastic cellulosic material the surface of which is hydrolyzed and mordanted and dyed with a plurality of dye images, there being substantially no diffusion of the dye.

2. An article of manufacture comprising an uncoated motion picture film support of cellulose nitrate the surface of which is hydrolyzed and mordanted and dyed with a plurality of dye images, there being substantially no diffusion of the dye.

CHARLES E. KENNETH MEES.